Patented Mar. 5, 1929.

1,704,636

UNITED STATES PATENT OFFICE.

JOSEPH A. SPINA, OF NIAGARA FALLS, NEW YORK, ASSIGNOR TO HOOKER ELECTROCHEMICAL COMPANY, OF NEW YORK, N. Y., A CORPORATION OF NEW YORK.

MANUFACTURE OF AMMONIUM BENZOATE.

No Drawing.    Application filed March 1, 1927. Serial No. 171,906.

This invention relates to an improved process for making ammonium benzoate, and particularly to a process for producing pure ammonium benzoate substantially free from water.

Ammonium benzoate has been commonly made by reacting ammonia with benzoic acid in the presence of a relatively large amount of water, either aqua ammonia or wet benzoic acid or both being used as reacting materials, after which the ammonium benzoate was separated from its aqueous solution by evaporation. It has been found extremely difficult to produce pure ammonium benzoate substantially free from water, by any of the previously known processes, since heating the wet product sufficiently to remove substantially all of the water results in a decomposition of the ammonium benzoate, and escape of ammonia. The ammonium benzoate as made heretofore has consequently been characterized by the presence of a relatively large quantity of water.

My present invention resides in the discovery of a simplified and inexpensive process whereby these disadvantages are obviated, and pure ammonium benzoate substantially free of water is produced, this process consisting essentially in reacting ammonia with benzoic acid while both of these substances are in a substantially anhydrous condition.

The invention may be practiced in a number of different ways. In the preferred embodiment the reaction is effected by introducing vaporized benzoic acid into a reaction chamber containing a slight excess of dry ammonia gas and then collecting the precipitated ammonium benzoate. This procedure yields a very high grade ammonium benzoate which is especially well adapted for preservative or pharmaceutical purposes.

While the above example illustrates the preferred embodiment of my invention, which is especially advantageous, other methods may be used; for example, the benzoic acid may be supplied in the form of a dry solid and preferably in a finely divided condition, and is constantly agitated while the anhydrous ammonia is reacted therewith either as a gas or as liquefied ammonia.

I claim:

1. A process for producing ammonium benzoate, which comprises reacting ammonia with benzoic acid, both of said compounds being in a substantially anhydrous condition.

2. A process for producing ammonium benzoate, which comprises reacting anhydrous ammonia in the gaseous state with substantially dry vaporized benzoic acid.

In testimony whereof, I affix my signature.

JOSEPH A. SPINA.